United States Patent …

(12) United States Patent
Hofmann et al.

(10) Patent No.: US 6,843,136 B2
(45) Date of Patent: Jan. 18, 2005

(54) MAGNETOINDUCTIVE FLOWMETER

(75) Inventors: Friedrich Hofmann, Straelen (DE); Arnould L. van Willigen, Capelle a/d Ijssel (NL); Bosboom J. Poortmann, Dordrecht (NL)

(73) Assignee: Krohne, A.G., Basel (CH)

( * ) Notice: Subject to any disclaimer, the term of this patent is extended or adjusted under 35 U.S.C. 154(b) by 0 days.

(21) Appl. No.: 10/603,029

(22) Filed: Jun. 24, 2003

(65) Prior Publication Data
US 2004/0040385 A1 Mar. 4, 2004

(30) Foreign Application Priority Data
Aug. 27, 2002 (DE) ........................................ 102 40 024

(51) Int. Cl.[7] ................................................. G01F 1/58
(52) U.S. Cl. ................................................... 73/861.12
(58) Field of Search ......................... 73/861.12, 861.08

(56) References Cited
U.S. PATENT DOCUMENTS 4,524,627 A * 6/1985 Yamasaki et al. ......... 73/861.12
4,914,950 A * 4/1990 Uematsu et al. .......... 73/861.12
4,938,073 A * 7/1990 Stephenson ............... 73/861.12
5,773,723 A * 6/1998 Lewis et al. .............. 73/861.12

FOREIGN PATENT DOCUMENTS

DE   33 44 679 A    6/1985
DE   41 39 915 A1   8/1992
WO   WO 85/04954 A1 11/1985

* cited by examiner

Primary Examiner—Edward Lefkowitz
Assistant Examiner—Jewel V. Thompson
(74) Attorney, Agent, or Firm—Cesari and McKenna, LLP

(57) ABSTRACT

A magnetoinductive flowmeter that serves to measure the flow rate of a moving medium incorporates a measuring conduit, a sampling-electrode channel extending through the wall of the measuring conduit, and a sampling electrode, which sampling electrode is positioned in the sampling-electrode channel in such fashion that its sampling-electrode head is recessed from the inner wall of the measuring conduit. A section of the sampling-electrode channel located in front of the sampling-electrode head and extending up to the interior of the measuring conduit is left as a free space. This results in an improved signal-to-noise ratio of a voltage signal collected at the sampling electrode.

6 Claims, 2 Drawing Sheets

MAGNETOINDUCTIVE FLOWMETER

BACKGROUND OF THE INVENTION

1. Field of the Invention

This invention relates to a magnetoinductive flowmeter for measuring the flow rate of a moving medium, with a measuring conduit through whose wall extends a sampling-electrode channel, and a sampling electrode that is positioned in the sampling-electrode channel in such fashion that the electrode head is recessed from the inside wall surface of the measuring conduit.

2. Description of the Prior Art

Magnetoinductive flowmeters have essentially been well-known for some time and have been employed in a variety of applications. The basic principle of a magnetoinductive flowmeter for measuring the flow rate of fluids and liquids goes all the way back to Faraday who, as early as 1832, suggested utilizing the principle of electrodynamic induction for measuring flow rates. According to Faraday's law of induction, a flowing medium that contains charge carriers and travels through a magnetic field will generate an electric field intensity perpendicular to the flow direction and perpendicular to the magnetic field. In a magnetoinductive flowmeter, Faraday's law of induction is employed in that a magnet, usually consisting of two field coils, generates a magnetic field perpendicular to the direction of flow through the measuring tube. Within that magnetic field, each volume component of the flowing medium, containing a given number of charge carriers, contributes its portion of the field intensity generated therein to a measuring voltage that can be collected via measuring or sampling electrodes. In conventional magnetoinductive flowmeters, the sampling electrodes are designed for conductive or capacitive coupling with the flowing medium. One salient feature of magnetoinductive flowmeters is the proportionality between the measured voltage and the flow rate of the medium as averaged across the diameter of the measuring tube, i.e. between the measured voltage and the volumetric flow.

A magnetoinductive flowmeter as referred to above is described for instance in WO 85/04954. In that particular magnetoinductive flowmeter, the section of the sampling electrode channel located in front of the sampling-electrode head and extending up to the interior of the measuring conduit is provided with a cap consisting of a porous ceramic material, of a glass frit or of a porous synthetic material. That cap is intended to prevent any fouling of, or other interference with, the surface of the sampling-electrode head or erroneous measuring results due to solid particles carried along by the flowing medium. While the porous cap protects the surface of the sampling-electrode head, it allows the liquid medium to penetrate so as to establish a conductive connection between the flowing medium and the sampling electrode. The end surface of the cap itself is mounted flush with the inner wall surface of the measuring conduit, which protects it from any impact by the flowing medium and from any abrasion by hard, solid particles carried along by the medium. Evidently, the porosity of the cap in front of the sampling electrode channel must be so chosen that it is permeable to liquids yet prevents solid particles in the medium from penetrating to the surface of the sampling-electrode head.

These solutions according to WO 85/04954 and other prior-art notwithstanding, a voltage signal collected at the sampling electrode will still contain a significant noise component especially when there is a substantial proportion of solid particles such as sand, etc. in the flowing medium. To be sure, the magnetoinductive flowmeter referred to above reduces that problem in that the sampling-electrode head itself is set back from the inner wall surface of the measuring conduit. However, given the fact that the cap, consisting of a porous material such as porous ceramic, fills the space in the sampling electrode channel in front of the sampling-electrode head, the sampling electrode receives only a weak signal, which by itself has a detrimental effect on the signal-to-noise ratio.

SUMMARY OF THE INVENTION

It is therefore the objective of this invention to introduce a magnetoinductive flowmeter that displays a good signal-to-noise ratio even when solid particles are interspersed in the medium flowing through the measuring conduit.

This objective is achieved in a conceptual enhancement of the magnetoinductive flowmeter design referred to above in that the section of the sampling electrode channel in front of the sampling-electrode head and extending up to the interior of the measuring conduit is left as an unoccluded space.

In other words, the invention provides for the space in front of the sampling-electrode head to be essentially devoid of any inserts or attachments, instead opening up and transitioning directly into the interior of the measuring conduit. With this essentially unobstructed free space in front of the sampling-electrode head, the flowing medium can always make direct contact with the electrode-head surface across the entire diameter of the measuring conduit and electrode head. This establishes a very good conductive connection between the medium traveling through the measuring conduit and the sampling electrode. Yet, because the electrode head is recessed from the inner wall of the measuring conduit, this design avoids any impingement on the electrode-head surface by the solids carried in the medium at the flow rate prevailing in the measuring conduit. In essence, the invention is based on the realization that a completely open space in the sampling electrode channel in front of the sampling-electrode head that is set back from the inner wall of the measuring conduit provides an altogether better signal-to-noise ratio than is obtainable with a porous ceramic cover shielding the recessed electrode head, which, while indeed preventing the solids in the medium from impinging on the surface of the electrode head, substantially diminishes the conductive contact between the medium and the surface of the sampling-electrode head.

Even a minor recession of the electrode head from the inner wall surface of the measuring conduit leads to a distinctly improved signal-to-noise ratio. It has been found, however, that a near-optimal signal-to-noise ratio can be obtained with a setback of the electrode head from the inner wall of the measuring conduit that essentially corresponds to twice the diameter of the sampling electrode channel.

The measuring conduit may be in the form of a measuring tube consisting of a nonconducting insulating substance such as a synthetic material. However, according to a preferred embodiment of the invention, the measuring conduit is constituted of a measuring tube with an electrically insulating internal liner, and the sampling-electrode head is recessed relative to the inner wall of that liner. In other words, it is the inner wall of the liner that constitutes the inner wall of the measuring conduit. In one preferred implementation of the invention, the setback of the sampling-electrode head from the inner wall surface of the liner matches the thickness of the liner. In this particular position of the sampling electrode in the sampling-electrode channel, the end of the electrode head would be flush with the inner wall surface of the measuring tube if the liner were removed.

When the inner wall of the measuring tube is provided with an electrically insulating liner, another preferred embodiment of the invention has the liner extend into the sampling electrode channel in such fashion that the inner wall of the sampling electrode channel is at least partly covered by the liner. The sampling electrode is thus electrically insulated from the measuring tube by the liner material that covers the inner wall of the electrode channel.

In a magnetoinductive flowmeter according to the invention that incorporates a measuring tube with an electrically insulating internal liner, the invention provides for a determination of the progressive ablation of the liner by the following method: a voltage signal is collected at the sampling electrode. That voltage signal is used not only for measuring the flow rate but also for quantifying the noise component of the voltage signal collected at the sampling electrode and comparing it to a reference value. Whenever the noise component of the voltage signal collected at the sampling electrode exceeds the reference value, it triggers the generation and transmission of a signal that is indicative of the progressive erosion of the liner in the measuring tube. With a suitably selected reference value, the user of a magnetoinductive flowmeter operated in this fashion can be alerted to the fact that the liner of the measuring tube will soon have to be replaced. The reference value against which the noise component of the voltage signal collected at the sampling electrode is compared, may be a fixed, absolute datum or, alternatively, it may be a relative variable derived, for instance, as a function of the initial value measured at the time the magnetoinductive flowmeter was first commissioned with a perfectly new liner.

There are numerous possible ways in which the magnetoinductive flowmeter according to the invention can be configured and further enhanced. In this context, attention is invited to the dependent patent claims and to the detailed description given below of a preferred embodiment of the invention with reference to the attached drawing.

DETAILED DESCRIPTION OF AN ILLUSTRATIVE EMBODIMENT

Figure 1:
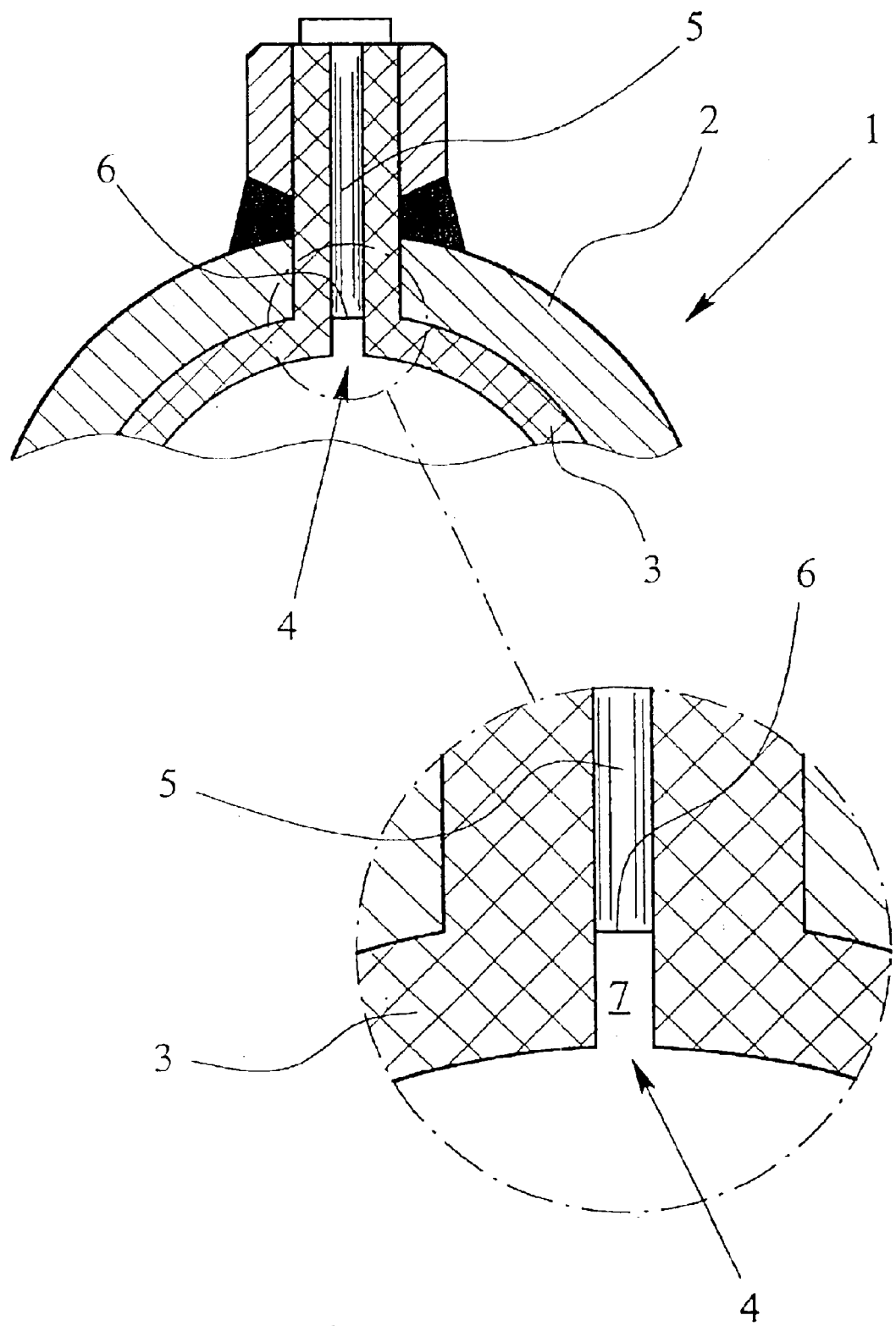
FIG. 1 is a schematic cross-section of a sampling electrode as configured in a preferred embodiment of the invention, including a detail enlargement showing the distance by which the sampling electrode is recessed from the inner wall of the measuring conduit with components of the magnetoinductive flowmeter that are not needed for an understanding of the invention have been omitted from the drawing figure.

The magnetoinductive flowmeter according to the preferred embodiment of the invention features a measuring conduit 1 composed of a measuring tube 2 and an electrically insulating internal liner 3. The wall of the measuring conduit 1 is provided with a sampling-electrode channel 4. Field coils, not illustrated, generate a magnetic field, inducing an electric voltage in the medium that flows through the measuring conduit 1. This voltage, induced in the medium, is collected by two mutually opposite sampling electrodes of which only one sampling electrode 5 is illustrated. The sampling electrode 5 is so positioned in the sampling electrode channel 4 that its sampling-electrode head 6 is recessed from the inner wall surface of the measuring conduit 1, i.e. the inner wall surface of the liner 3. This leaves an empty section or space 7 in the sampling electrode channel 4 in front of the sampling-electrode head 6. That space 7 is completely free, without any insert, cap or cover, thus allowing the medium that flows through the measuring conduit 1 to make full contact with the electrode head 6 over the entire cross section of the sampling electrode channel 4.

As is evident especially from the detail enlargement in the drawing, the sampling-electrode head 6 is recessed from the inner wall of the liner 3 by a distance that corresponds to twice the diameter of the sampling electrode channel 4. That particular position of the sampling electrode 5 in the electrode channel 4 yields a near-optimal signal-to-noise ratio.

The drawing figure also shows that the sampling-electrode head 6 is recessed from the inner wall of the liner 3 by a distance that corresponds to the thickness of the liner 3, and that the liner 3 extends into the sampling-electrode channel 4, covering at least part of the inner wall of the sampling-electrode channel 4 with material of the liner 3, thus providing an electrical insulation between the measuring tube 2 and the sampling electrode 5.

The configuration depicted in the figure allows for the detection of the erosion of the liner 3 in the measuring tube 2 via a method whereby the noise component in the voltage signal collected at the sampling electrode 5 is determined and compared with a predefined, fixed reference value. If and when the noise component of the voltage signal collected at the sampling electrode 5 exceeds that reference value, it will generate and transmit a signal that alerts the user of the magnetoinductive flowmeter, designed according to the preferred embodiment of the invention, to the advanced state of erosion of the liner 3 in the measuring tube 2. The user is thus made aware of the impending need to replace the liner 3.

Figure 2:
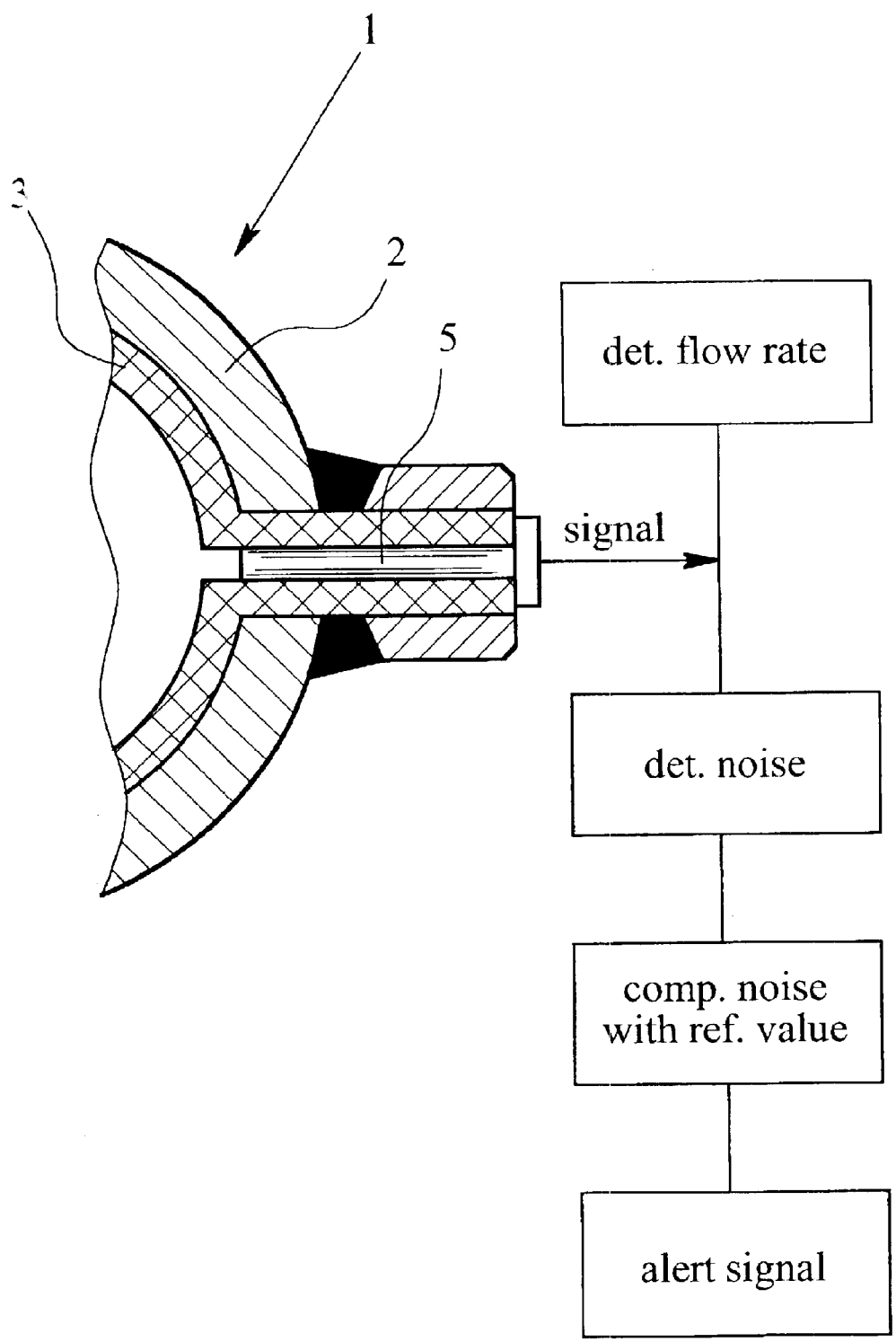
FIG. 2 is a schematic and block diagram showing apparatus for carrying out the liner erosion determination according to the invention.

This method for detection of the erosion of the liner 3 in the measuring tube 2 is also shown in FIG. 2. The voltage signal collected at the sampling electrode 5 is used for the determination of the flow rate as known from conventional magnetoinductive flowmeters. Further, the noise component of this signal is determined with a conventional noise determination method, and the noise component is compared with a predefined, fixed reference value. When the noise component of the voltage signal collected at the sampling electrode 5 exceeds that predefined and fixed reference value, an alert signal is generated in order to indicate that the erosion of the liner 3 in the measuring tube 2 is in an advanced state.

What is claimed is:

1. A magnetoinductive flowmeter serving to measure the flow rate of a moving medium, with a measuring conduit, said flow meter comprising a sampling-electrode channel that extends through the wall of the measuring conduit, and a sampling electrode, said sampling electrode being so positioned in the sampling-electrode channel that its electrode head is recessed from the inner wall of the measuring conduit, wherein a section of the sampling-electrode channel located in front of the sampling-electrode head is a free space extending up to the interior of the measuring conduit.

2. The magnetoinductive flowmeter as in claim 1, wherein the sampling-electrode head is recessed from the inner wall of the measuring conduit by a distance corresponding to twice the diameter of the sampling-electrode channel.

3. The magnetoinductive flowmeter as in claim 1 or 2, wherein the measuring conduit comprises a measuring tube provided with an electrically insulating internal liner and that the sampling-electrode head is recessed from the inner wall of said liner.

4. The magnetoinductive flowmeter as in claim 3, wherein the sampling-electrode head is recessed from the inner wall of the liner by a distance corresponding to the thickness of the liner.

5. The magnetoinductive flowmeter as in claim 3, wherein the liner extends into the sampling-electrode channel in such fashion as to cover at least part of the inner wall of the sampling-electrode channel with the liner.

6. A method for determining the erosion of the liner in the measuring tube of a magnetoinductive flowmeter that serves to measure the flow rate of a medium moving through the measuring tube equipped with a liner and that is provided with a sampling-electrode channel extending through the wall of the measuring tube and through the liner and accommodating a sampling electrode that is so positioned in the sampling-electrode channel that its sampling-electrode head is recessed from the inner wall of the liner in a way as to leave free a section of the sampling-electrode channel located in front of the sampling-electrode head and extending up to the interior of the liner-equipped measuring tube, said method providing for a voltage signal to be collected at the sampling electrode and for the noise component of the voltage signal collected at the sampling electrode to be determined and compared against a reference value whereby, if and when said noise component of the voltage signal collected at the sampling electrode exceeds said reference value, a signal is generated and transmitted that indicates an advanced state of erosion of the liner in the measuring tube.

* * * * *

UNITED STATES PATENT AND TRADEMARK OFFICE
CERTIFICATE OF CORRECTION

PATENT NO. : 6,843,136 B2
DATED : January 18, 2005
INVENTOR(S) : Friedrich Hofmann et al.

It is certified that error appears in the above-identified patent and that said Letters Patent is hereby corrected as shown below:

Title page,
Item [75], Inventors, change "Bosboom" to -- Boudewijn --

Signed and Sealed this

Twenty-ninth Day of March, 2005

JON W. DUDAS
*Director of the United States Patent and Trademark Office*